US009857928B2

(12) United States Patent
Kemppinen et al.

(10) Patent No.: US 9,857,928 B2
(45) Date of Patent: Jan. 2, 2018

(54) FORCE SENSITIVE DEVICE (71) Applicant: Microsoft Technology Licensing, LLC, Redmond, WA (US)

(72) Inventors: Pasi Kemppinen, Tampere (FI); Matti Pellikka, Lempäälä (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 154 days.

(21) Appl. No.: 14/847,441

(22) Filed: Sep. 8, 2015

(65) Prior Publication Data
US 2017/0068348 A1 Mar. 9, 2017

(51) Int. Cl.
G06F 3/045 (2006.01)
G06F 3/044 (2006.01)
G06F 3/041 (2006.01)

(52) U.S. Cl.
CPC .............. *G06F 3/044* (2013.01); *G06F 3/041* (2013.01); *G06F 3/0412* (2013.01); *G06F 3/0414* (2013.01); *G06F 2203/04103* (2013.01); *G06F 2203/04105* (2013.01)

(58) Field of Classification Search
CPC ........ G06F 3/044; G06F 3/041; G06F 3/0412; G06F 3/0414; G06F 2203/04103; G06F 2203/04105
See application file for complete search history.

(56) References Cited

U.S. PATENT DOCUMENTS

| 8,144,453 | B2 | 3/2012 | Brown et al. | |
| 8,552,936 | B2 | 10/2013 | Hente | |
| 8,786,572 | B2 | 7/2014 | Yilmaz | |
| 8,797,295 | B2 | 8/2014 | Bernstein et al. | |
| 8,830,180 | B2 | 9/2014 | Yilmaz et al. | |
| 9,715,301 | B2* | 7/2017 | Kuboyama | G06F 3/0414 |
| 2002/0149571 | A1* | 10/2002 | Roberts | G06F 3/0414 |
| | | | | 345/174 |
| 2002/0180710 | A1* | 12/2002 | Roberts | G06F 1/1626 |
| | | | | 345/173 |

(Continued)

FOREIGN PATENT DOCUMENTS

| WO | 2014092758 A1 | 6/2014 |
| WO | 2014124173 A1 | 8/2014 |
| WO | 2015123322 A1 | 8/2015 |

OTHER PUBLICATIONS

"International Search Report and Written Opinion Issued in PCT Application No. PCT/US2016/045453", dated Oct. 12, 2016, 11 Pages.

(Continued)

*Primary Examiner* — Amare Mengistu
*Assistant Examiner* — Crystal A Mathews (57) ABSTRACT

A display with a force sensing function has two layers of a reference voltage, for example a ground voltage. One reference voltage layer is inside the display stack. A sensor layer between the two reference voltage layers senses capacitance from the distance between the sensor layer and the reference voltage layer. The capacitance changes according to the force applied to the display, as the display moves slightly when the user presses the display. A thin foam layer allows the distance between the sensor layer and the reference voltage to change. This change is reflected in the measured capacitance. Multiple force sensors also enable detection of the position of the touch.

20 Claims, 3 Drawing Sheets

(56) References Cited

U.S. PATENT DOCUMENTS

| | | | |
|---|---|---|---|
| 2008/0238884 A1* | 10/2008 | Harish | G06F 3/016 345/174 |
| 2010/0156838 A1* | 6/2010 | Han | G06F 3/044 345/174 |
| 2010/0220065 A1* | 9/2010 | Ma | G06F 3/016 345/173 |
| 2010/0253645 A1 | 10/2010 | Bolender | |
| 2011/0025631 A1* | 2/2011 | Han | G06F 3/0414 345/173 |
| 2011/0057904 A1* | 3/2011 | Yamano | G06F 3/0414 345/174 |
| 2011/0148812 A1* | 6/2011 | Hente | H03K 17/962 345/174 |
| 2011/0157087 A1* | 6/2011 | Kanehira | G06F 3/0414 345/174 |
| 2011/0187674 A1* | 8/2011 | Baker | G01L 1/10 345/174 |
| 2012/0105358 A1* | 5/2012 | Momeyer | G06F 3/0414 345/174 |
| 2012/0212445 A1 | 8/2012 | Heikkinen et al. | |
| 2013/0155017 A1 | 6/2013 | Rehn et al. | |
| 2013/0257769 A1 | 10/2013 | Sheik-Nainar | |
| 2013/0342501 A1* | 12/2013 | Molne | G06F 3/0414 345/174 |
| 2014/0028575 A1 | 1/2014 | Parivar et al. | |
| 2014/0062291 A1* | 3/2014 | Jang | G09F 9/30 313/504 |
| 2014/0085213 A1* | 3/2014 | Huppi | 345/173 |
| 2014/0240288 A1 | 8/2014 | Bulea | |
| 2014/0267134 A1 | 9/2014 | Bulea et al. | |
| 2015/0138112 A1* | 5/2015 | Campbell | G06F 3/0414 345/173 |
| 2015/0261371 A1* | 9/2015 | Li | G06F 3/041 345/174 |
| 2015/0370376 A1* | 12/2015 | Harley | G06F 3/0414 345/174 |
| 2015/0370396 A1* | 12/2015 | Hotelling | G06F 3/0414 345/174 |
| 2016/0098131 A1* | 4/2016 | Ogata | G06F 1/1643 345/173 |
| 2016/0103542 A1* | 4/2016 | Ogata | G06F 1/1643 345/174 |
| 2016/0103544 A1* | 4/2016 | Filiz | G06F 3/0414 345/174 |
| 2016/0328065 A1* | 11/2016 | Johnson | G06F 3/03545 |

OTHER PUBLICATIONS

Cravotta, Robert, "User Interfaces Channel", Published on: Dec. 17, 2010 Available at: http://www.embeddedinsights.com/channels/channels/user-interfaces/page/2/.

"Second Written Opinion Issued in PCT Application No. PCT/US2016/045453", Dated: Jul. 19, 2017, 4 pages.

\* cited by examiner

FORCE SENSITIVE DEVICE

BACKGROUND

Touch sensitive displays are a well-known solution for user interfaces. The display senses the position of the touch on the screen. Additional features may be utilized in the user interface when the display detects the force of the touch—for example, the user may apply more force against the display to increase a displayed value on the screen. Current trends of the mobile or hand-held devices focus on thinner devices. The sensors sensing the force are aimed to be thin and/or light in order to fit into the device stack that forms the smartphone or any other device. A complex structure would require multiple layers on the display stack, thereby increasing the thickness of the display. The embodiments described below are not limited to implementations which solve any or all of the disadvantages of known displays with force sensors.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A display with a force sensing function has two layers of a reference voltage, for example a ground voltage. One reference voltage layer is inside the display stack. A sensor layer between the two reference voltage layers senses capacitance from the distance between the sensor layer and the reference voltage layer. The capacitance changes according to the force applied to the display, as the display moves slightly when the user presses the display. A thin foam layer allows the distance between the sensor layer and the reference voltage to change. This change is reflected in the measured capacitance. Multiple force sensors also enable detection of the position of the touch.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Although the present examples are described and illustrated herein as being implemented in a smartphone, the device described is provided as an example and not a limitation. As those skilled in the art will appreciate, the present examples are suitable for application in a variety of different types of mobile and/or hand-held apparatuses, e.g. in tablets, laptops or gaming consoles. Force sensing may be used in various applications and apparatuses with a display. The display may be a peripheral connected to a system, wherein at least a portion of the user interface is configured to the display. In one embodiment the display is arranged inside a car, wherein the driver or passenger may operate the display with the force sensing feature.

Figure 1:
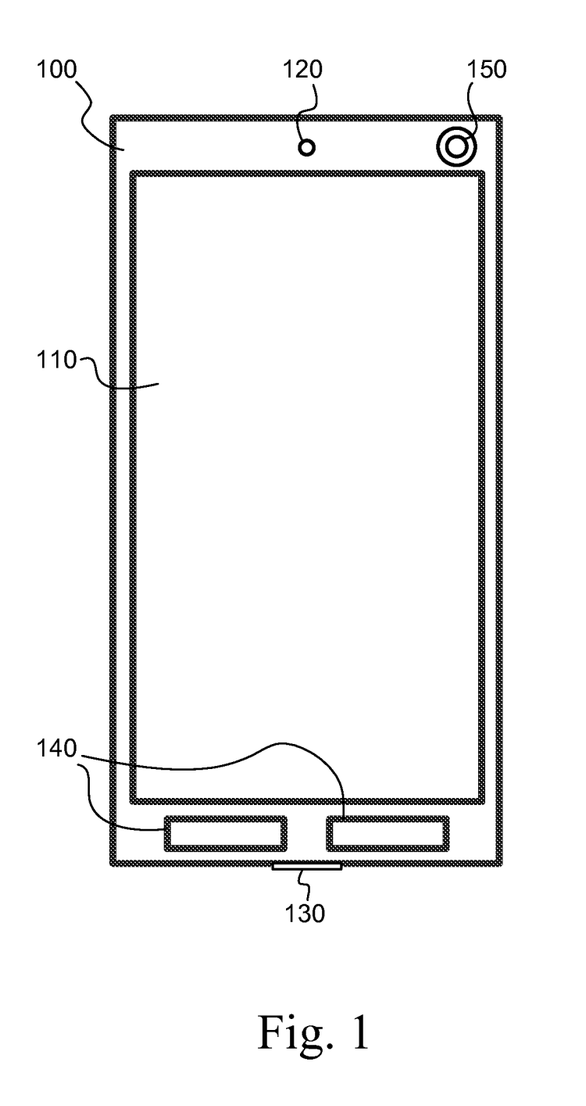
FIG. 1 illustrates a device according to an embodiment.

FIG. 1 illustrates a device according to an embodiment, wherein the device is a smartphone. The device comprises a body 100 comprising a display 110, a speaker 120, a microphone 130, keys 140 and a camera 150. The device comprises at least one processor and at least one memory including computer program code for one or more programs. The at least one memory and the computer program code are configured, with the at least one processor, to cause the apparatus to perform at least the functionality described herein. The system described hereinafter may comprise a portion of the portable device, its components and/or peripherals connected to the portable device.

Figure 2:
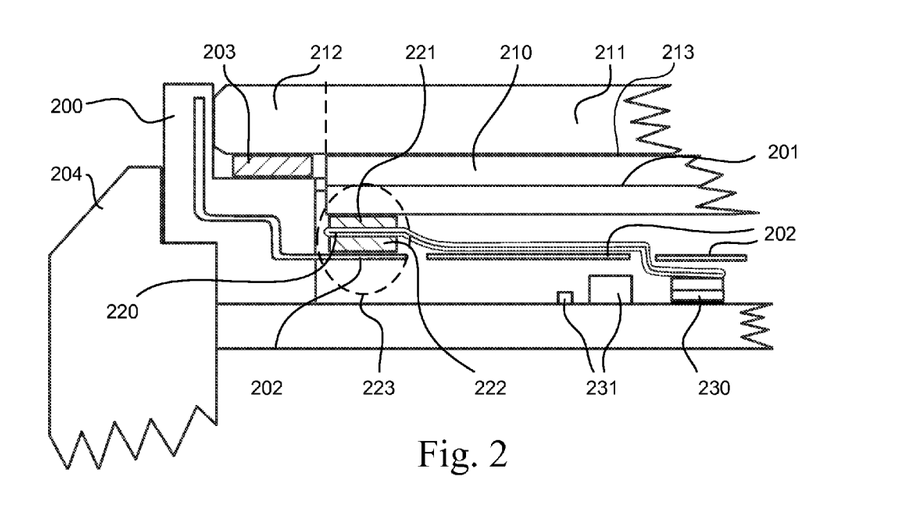
FIG. 2 illustrates a cross-sectional view of one device with a display.

FIG. 2 illustrates a cross-sectional view of a device with a display, wherein a portion of the structure is shown. In this embodiment the device is a smartphone. A device body may comprise different constructions. In one embodiment the body is a unibody design, wherein the body consists of a single shell that is the principal source of structural strength and is configured to carry the components. In one embodiment the body comprises multiple parts, wherein the structural strength and component placement is carried out by different parts of the body. In the embodiment of FIG. 2 the device body comprises a display frame 200 and a cover structure 204. A display 210 is visible under a cover glass 211. The display 210 may be attached to the display frame 200. The cover glass 211 protects the display from external elements, such as moisture or mechanical damage. In one embodiment the display 210 is attached to the cover glass 211 with a transparent adhesive 213. The cover glass 211 is made of durable transparent material that may comprise a coating made of another material, not limiting the cover glass material to glass. In this context, directions such as "top", "higher" or "up" relate to the visible side of the display 210; and "bottom", "lower" or "down" relate to the side of the display 210 that is attached to the device.

A portion 212 of the cover glass 211 extends over the edges of the display 210. An adhesive 203 attaches the cover glass 211 to the display frame 200 from the cover glass portion 212. An adhesive 203 attaches the cover glass 211 to the display frame 200. The outer cover structure 204 is configured to provide rigidity to the device and protection on the outer edges of the device. The cover structure 204 may be openable by the user. Various cover structure 204 arrangements are possible without affecting the functionality of the force sensing. As the cover glass 211 is attached to the display 210, the adhesive 203 attaches the display 210 to the display frame 200 from the cover glass portion 212. In one embodiment the display is an OLED display (OLED, Organic Light-Emitting Diode). The display 210 comprises a first conductive layer 201 that provides a reference voltage. The first conductive layer 201 may be a common voltage layer, configured to comprise a single function, such as a VCOM layer for the display or a guard electrode layer for the touch sensing if the display is configured to sense touch.

In one embodiment the first conductive layer 201 comprises two functions, a VCOM layer for the display mode and a guard electrode layer for the touch sensing mode, wherein the modes are configured to alternate according to the function.

A second conductive layer 202 is configured on the display frame 200 to provide a reference voltage. In an embodiment, both the first conductive layer 201 and the second conductive layer 202 provide the same reference voltage. The reference voltage may be a ground voltage, a device chassis voltage, a phone chassis voltage or a floating ground, wherein the grounding may be provided through the user holding the display frame 200 of the device. The reference voltage may also be other predefined voltage level provided to the first conductive layer 201 and/or to the second conductive layer 202 by a measurement circuit. A sensor layer 220 is positioned between the first conductive layer 201 and the second conductive layer 202. A first dielectric layer 221 provides a distance between the first conductive layer 201 and the sensor layer 220, and a second dielectric layer 222 provides a distance between the second conductive layer 202 and the sensor layer 220. The sensor layer 220 is configured to detect capacitance between the reference voltage and the sensor layer 220. For example, a charge is induced on the sensor layer 220 and the capacitance measurement circuitry produces a voltage signal or the reference voltage for the first conductive layer 201 or the second conductive layer 202.

At least one of the first dielectric layer 221 and the second dielectric layer 222 is made of compressible material configured to compress due to a force applied to the display. The sensor layer 220 may only cover a portion of the display area, wherein the sensor area detects the movement of the display 210. One example of the movement is the display 210 bending towards the sensor layer 220 as a response to the user applying force to the display 210 or pressing the display 210. In one example the display 210 moves sideways as the adhesive 203 and/or the adhesive layer 213 may allow lateral flex to the display 210 in relation to the sensor layer 220. The compressible material may be made of foam or elastic material such as rubber or a gel-like material. In one embodiment the compressible material is foam. In one embodiment the foam is made of polyolefin and polyester. The foam may be used to cushion the display 210 against damage. The positioning of the sensor layer 220 and the foam layers 221, 222 in the area 223 under the display 210 provides more leverage to detecting the force from the display when compared to sensors positioned close to the edge of the cover glass 212. The compressible material 221, 222 has at least two purposes: cushioning the display and providing distance from the sensor layer 220 to the first conductive layer 201 and the second conductive layer 202.

In one embodiment the foam thickness is between 0.05 mm to 0.2 mm. In one embodiment the foam thickness is about 0.1 mm. The foam may compress for up to 20% of the original thickness. In one embodiment the foam is supersoft foam.

A capacitive force sensor detects the changes in the capacitance from the sensor layer 220 against the reference voltage present at the first conductive layer 201 and the second conductive layer 202. In one embodiment the first conductive layer 201 is configured to the lower surface of the display 210, under the display 210. In one embodiment the first conductive layer 201 is configured to the areas near the edge of the display 210, wherein the layer may be made of a grounded copper tape, a printed conductive area or an ITO area on the lower surface of the cover glass 211. The change in the capacitance detected at the sensor layer 220 is proportional to the variable distance between the first conductive layer 201 and the sensor layer 220. When the user applies force to the cover glass 211, for example by pressing it with a finger, the cover glass 211 moves slightly. The movement of the cover glass 211 causes the display 210 to move as well, whereby the distance between the first conductive layer 201 and the sensor layer 220 is temporarily reduced. The display 210 may also move sideways due to the flexibility of the adhesive material 213. When the user releases the force applied to the cover glass 211, the structure retains its original form and the original distance between the first conductive layer 201 and the sensor layer 220. Variable background capacitance or parasitic capacitance could create unreliable results for measuring the capacitance; therefore, the sensor layer 220 is sandwiched between two layers both the reference voltage. The reference voltage may be the same for the first conductive layer 201 and the second conductive layer 202 or the layers 201, 202 may have different reference voltages. The reference voltage is kept constant over a long period of time. This configuration reduces the effect of background capacitance or parasitic capacitance and the capacitive measurement from the sensor layer 220 focuses to detecting movement of reference layers 201, 202. In one embodiment the backside of the device moves, causing the second conductive layer 202 to move closer to the sensor layer 220 or in relation to the sensor layer 220. The configuration senses the force applied on the backside of the device. In an embodiment, both sides of the device move, causing measurement of the force applied to the surface of both sides of the device.

In one embodiment the first dielectric layer 221 is made of compressible material and the second dielectric layer 222 is made of solid material. The solid material in this context refers to a material that is not compressible in the measurement range of the force applied by a human finger to a portable device. In one embodiment the first dielectric layer 221 is made of solid material and the second dielectric layer 222 is made of compressible material. These embodiments may be used to differentiate the detection range of the force applied to the device surface. In one embodiment the sensor layer 220 detects the battery swell, as the swelling battery may alter the distance between the sensor layer 220 and the first conductive layer 201 or the second conductive layer 202.

The sensor layer 220 is in one embodiment configured as a conductor inside an insulating layer. In one embodiment the sensor layer 220 comprises a flat polyamide-copper-polyamide configuration with a flat structure. In one embodiment the conductor inside the sensor layer 220 extends to a force detecting element 230 through the second conductive layer 202. The second conductive layer 202 may extend to the sides on the device, providing further protection to force sensing elements. In one embodiment the second conductive layer 202 extending to the sides may be used to detect force sensing from the sides of the device.

In an embodiment the device comprises at least one processor 231 and a memory storing instructions that, when executed, cause the device to transform the capacitance detected from the sensor layer 220 to correspond to the force applied to the display 210. The device comprises a force detecting element 230 that is connected to the conductor extending from the sensor layer 220. The force detecting element 230 detects the voltage received from the sensor layer 220 and transforms the voltage information to force information. The force detecting element 230 may be implemented partially by the operating system of the portable device; it may be implemented by hardware or partially by hardware and partially by embedded software. In an embodiment the software or a part of the software is configured in a cloud computing environment and at least a portion of the software is executed in the cloud computing environment. In one embodiment the force detecting element 230 and the at least one processor 231 are integrated as a single component. In one embodiment the force detecting element is configured to detect the position of a touch on the display.

In an embodiment the at least one processor and the memory storing instructions cause, when executing the instructions, the device to calibrate a sensor at the sensor layer by moving a predefined measurement range between a minimum capacitance value and a maximum capacitance value. The measurement range may be 40 pF that is moved inside the value range detectable by the force detecting element 230. The measurement range and the measurement resolution may vary according to the embodiment or according to the design of the capacitance measurement circuit.

Figure 3:
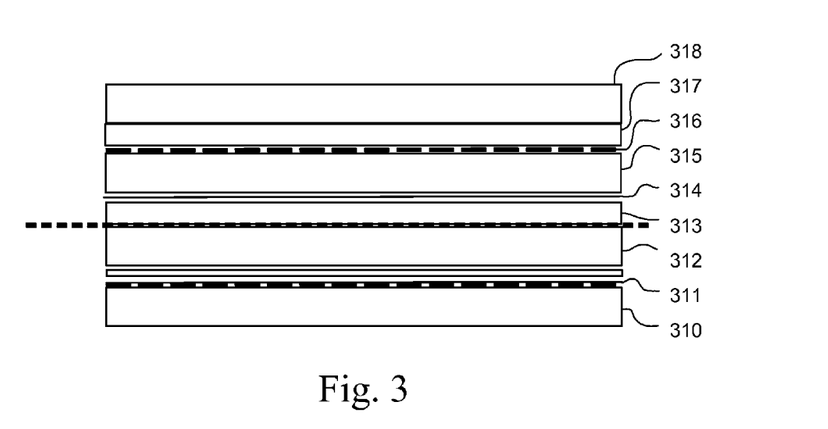
FIG. 3 illustrates one embodiment of a display stack.

FIG. 3 illustrates one embodiment of a display stack. An array glass 310 forms the bottom layer of the display stack. The display panel 311 may be a LCD panel, a LED, an OLED, an AMOLED panel or any means for presenting an image, wherein the first conductive layer is sufficiently stiff to move according to the display. The display may be configured to detect touch with a capacitive sensor. A display driver operates and controls the display panel 311. The display driver may be a separate integrated circuit connected to the display panel 311. On top of the display panel 311 there is a color filter 312 that may be made of glass. Display functions are arranged on the lower portion of the display stack and touch functions are arranged on the upper portion. An adhesive layer 313 connects the color filter 312 and a guard layer 314 used for sensing touch. In this arrangement a touch sensor substrate 315 separates the self-capacitance sensing layers, the lower guard layer 314 and an upper electrode layer 316. The electrode layer 316 may comprise multiple sensors on the same layer according to the desired touch sensing resolution. Electrodes may be arranged in an array and they may be square or any other shape in two dimensions on the electrode layer 316. A touch control 320 is connected to the guard layer 314 and the electrode layer 316. A cover glass 318 forms the top layer. It is connected to the electrode layer 316 and to the touch sensor substrate layer 315 with an adhesive layer 317. The cover glass 318 may be made of glass or any other suitable transparent and durable material.

Figure 4:
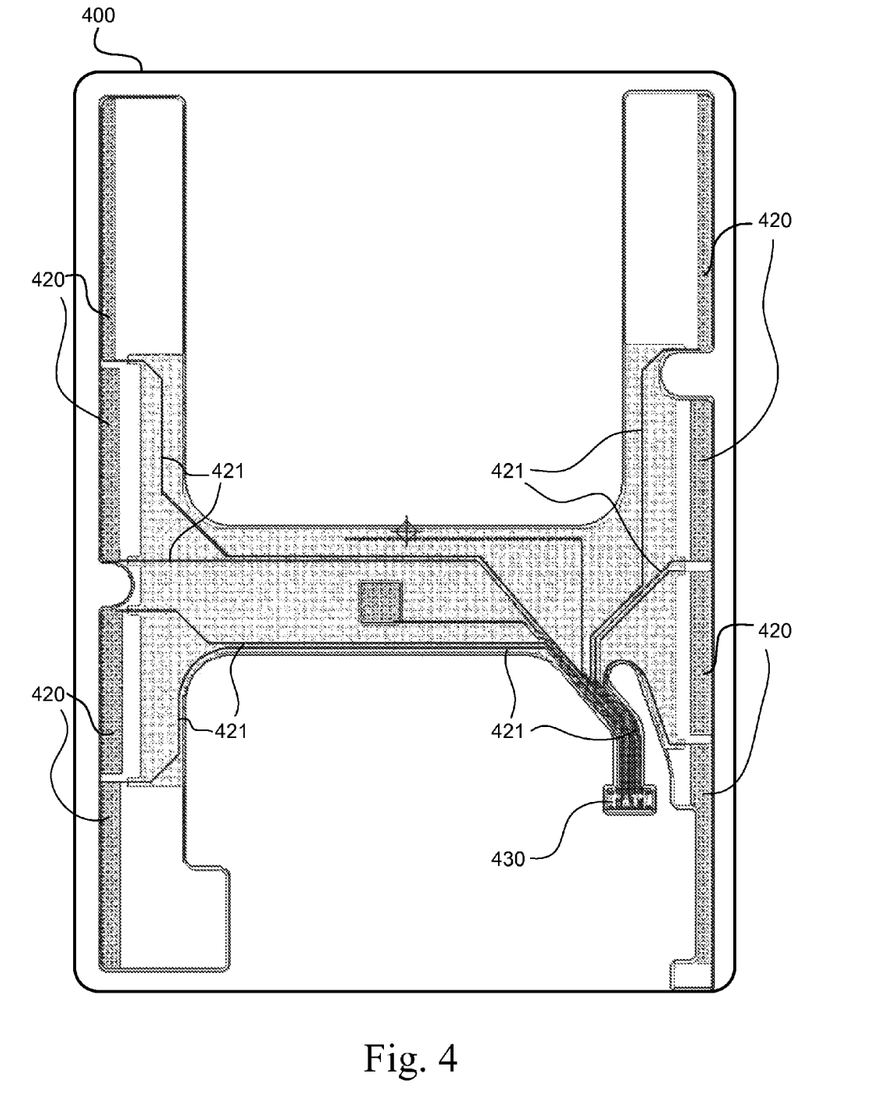
FIG. 4 illustrates one embodiment of the sensor layer placement on the device.

FIG. 4 illustrates one embodiment of the sensor layer placement on the device. In one embodiment the device comprises a plurality of sensors 420 at the sensor layer. The sensors 420 may detect the capacitance from the first conductive layer and/or the second conductive layer. The sensors 420 may also comprise dummy sensor lines configured to detect environmental effects that differ from the capacitive movement measurement. These environmental effects may be filtered from the capacitance detected from the sensors arranged on the sensor layer. The sensors 420 may be located near the corners of the device body 400. Conductors 421 conduct the sensor information to a force sensing element 430. The force sensing element 430 may be configured on the same layer as the sensors 420 or it may be configured on another layer on the body 400, wherein the component 430 provides a connector to the force sensing element. When the user applies force to the display, the plurality of sensors 420 in the sensor layer detect different values as the leverage of the moving display affects sensors 420 at each corner in a different manner. The at least one processor and the memory storing instructions cause, when executing the instructions, the device to detect the position of the force applied to the display according to the difference detected from different sensors 420. The display may also comprise a touch detecting function, wherein the information from the touch detecting element may be used with the force sensing element. In one embodiment the force sensing element detects the position of the touch when the display is off. This feature may save battery charge on the device. In one embodiment, compressible material is used for cushioning the display in some areas without having the sensor element 420 in between.

One aspect discloses a device, comprising: a body, a display having a cover glass extending over the edges of the display, an adhesive configured to attach the display to the body from the cover glass portion, a first conductive layer on the display configured to provide a reference voltage, a second conductive layer on the body configured to provide a reference voltage, a sensor layer configured to detect capacitance between the reference voltage and the sensor layer, a first dielectric layer configured to provide a distance between the first conductive layer and the sensor layer, and a second dielectric layer configured to provide a distance between the second conductive layer and the sensor layer; wherein at least one of the first dielectric layer and the second dielectric layer is made of foam configured to compress due to a force applied to the display. In an embodiment the device comprises at least one processor and a memory storing instructions that, when executed, cause the device to transform the capacitance detected from the sensor layer to correspond to the force applied to the display. In an embodiment the device comprises a plurality of sensors at the sensor layer, wherein the at least one processor and the memory storing instructions cause, when executing the instructions, the device to detect the position of the force applied to the display. In an embodiment the at least one processor and the memory storing instructions cause, when executing the instructions, the device to calibrate a sensor at the sensor layer by moving a predefined measurement range between a minimum capacitance value and a maximum capacitance value. In an embodiment the display is an Organic Light-Emitting Diode display. In an embodiment the first dielectric layer and the second dielectric layer are made of foam. In an embodiment the first dielectric layer is made of foam and the second dielectric layer is made of solid material. In an embodiment the first dielectric layer is made of solid material and the second dielectric layer is made of foam.

One aspect discloses a display structure, comprising: a body, a display having a cover glass extending over the edges of the display, an adhesive configured to attach the display to the body from the cover glass portion extending over the edges of the display, a first conductive layer on the display configured to provide a reference voltage, a second conductive layer on the body configured to provide a reference voltage, a sensor layer configured to detect capacitance between the reference voltage and the sensor layer, a first dielectric layer configured to provide a distance between the first conductive layer and the sensor layer, and a second dielectric layer configured to provide a distance between the second conductive layer and the sensor layer; wherein at least one of the first dielectric layer and the second dielectric layer is made of a compressible material configured to compress due to a force applied to the display. In an embodiment the display is configured to move and the compressible material is configured to compress when the force is applied to the display, wherein the force is equivalent to the force caused by a human finger. In an embodiment the display is an Organic Light-Emitting Diode display. In an embodiment the compressible material in the first dielectric layer and in the second dielectric layer is made of foam. In an embodiment the compressible material in the first dielectric layer is made of foam and the second dielectric layer is made of solid material. In an embodiment the first dielectric layer is made of solid material and the second dielectric layer is made of foam.

One aspect discloses a system, comprising: a body, a display having a cover glass extending over the edges of the display, an adhesive configured to attach the display to the body from the cover glass portion, a first conductive layer on the display configured to provide a reference voltage, a second conductive layer on the body configured to provide a reference voltage, a sensor layer configured to detect capacitance between the reference voltage and the sensor layer, a first dielectric layer configured to provide a distance between the first conductive layer and the sensor layer, and a second dielectric layer configured to provide a distance between the second conductive layer and the sensor layer; wherein at least one of the first dielectric layer and the second dielectric layer is made of foam configured to compress due to the force applied to the display. In an embodiment the system comprises at least one processor and a memory storing instructions that, when executed, cause the system to transform the capacitance detected from the sensor layer to correspond to the force applied to the display. In an embodiment the system comprises a plurality of sensors at the sensor layer, wherein the at least one processor and the memory storing instructions cause, when executing the instructions, the system to detect the position of the force applied to the display. In an embodiment the at least one processor and the memory storing instructions cause, when executing the instructions, the system to calibrate a sensor at the sensor layer by moving a predefined measurement range between a minimum capacitance value and a maximum capacitance value. In an embodiment the display is configured to move and the foam is configured to compress when the force is applied to the display, wherein the force is equivalent to the force caused by a human finger. In an embodiment the display is an Organic Light-Emitting Diode display.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the force detection element functionality may be performed by one or more hardware logic components.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that are accessible by a computing based device. Computer-readable media may include, for example, computer storage media such as memory and communications media. Computer storage media, such as memory, include volatile and non-volatile, removable and non-removable media implemented in any method or technology for storage of information such as computer readable instructions, data structures, program modules or other data. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media do not include communication media. Therefore, a computer storage medium should not be interpreted to be a propagating signal per se. Propagated signals may be present in computer storage media, but propagated signals per se are not examples of computer storage media. Although the computer storage media are shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some examples the user input device may detect voice input, user gestures or other user actions and may provide a natural user interface (NUI). This user input may be used to configure the device for a particular user. In an embodiment the display device may also act as the user input device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A device, comprising:
a body,
a display having a cover glass extending over the edges of the display,
an adhesive configured to attach the display to the body from the cover glass portion,
a first conductive layer on the display configured to provide a first reference voltage,
a second conductive layer on the body configured to provide a second reference voltage,
a sensor layer configured to detect capacitance between the first reference voltage and the sensor layer,
a first dielectric layer configured to provide a distance between the first conductive layer and the sensor layer, and
a second dielectric layer configured to provide a distance between the second conductive layer and the sensor layer; wherein
at least one of the first dielectric layer or the second dielectric layer is made of foam configured to compress due to a force applied to the display,
wherein the sensor layer is positioned between the first conductive layer and the second conductive layer beneath only a portion of the display at or near an edge of the display.

2. A device according to claim 1, comprising at least one processor and a memory storing instructions that, when executed, cause the device to transform the capacitance detected from the sensor layer to correspond to the force applied to the display.

3. A device according to claim 2, comprising a plurality of sensors at the sensor layer, wherein the at least one processor and the memory storing instructions cause, when executing the instructions, the device to detect the position of the force applied to the display.

4. A device according to claim 2, wherein the at least one processor and the memory storing instructions cause, when executing the instructions, the device to calibrate a sensor at the sensor layer by moving a predefined measurement range between a minimum capacitance value and a maximum capacitance value.

5. A device according to claim 1, wherein the display is an Organic Light-Emitting Diode display.

6. A device according to claim 1, wherein the first dielectric layer and the second dielectric layer are made of foam.

7. A device according to claim 1, wherein the first dielectric layer is made of foam and the second dielectric layer is made of solid material.

8. A device according to claim 1, wherein the first dielectric layer is made of solid material and the second dielectric layer is made of foam.

9. A display structure, comprising:
a body,
a display having a cover glass extending over the edges of the display,
an adhesive configured to attach the display to the body from the cover glass portion extending over the edges of the display,
a first conductive layer on the display configured to provide a reference voltage,
a second conductive layer on the body configured to provide the reference voltage,
a sensor layer configured to detect capacitance between the reference voltage and the sensor layer, a first dielectric layer configured to provide a distance between the first conductive layer and the sensor layer, and a second dielectric layer configured to provide a distance between the second conductive layer and the sensor layer; wherein at least one of the first dielectric layer or the second dielectric layer is made of a compressible material configured to compress due to a force applied to the display, wherein the sensor layer is positioned between the first conductive layer and the second conductive layer beneath only a portion of the display at or near an edge of the display.

10. A display structure according to claim 9, wherein the display is configured to move and the compressible material is configured to compress when the force is applied to the display, wherein the force is equivalent to the force caused by a human finger.

11. A display structure according to claim 9, wherein the display is an Organic Light-Emitting Diode display.

12. A display structure according to claim 9, wherein the compressible material in the first dielectric layer and in the second dielectric layer is made of foam.

13. A display structure according to claim 9, wherein the compressible material in the first dielectric layer is made of foam and the second dielectric layer is made of solid material.

14. A display structure according to claim 9, wherein the first dielectric layer is made of solid material and the second dielectric layer is made of foam.

15. A system, comprising:
a body,
a display having a cover glass extending over the edges of the display,
an adhesive configured to attach the display to the body from the cover glass portion,
a first conductive layer on the display,
a second conductive layer on the body,
a reference voltage provided by at least one of the first conductive layer or the second conductive layer,
a sensor layer configured to detect capacitance between the reference voltage and the sensor layer,
a first dielectric layer configured to provide a distance between the first conductive layer and the sensor layer, and
a second dielectric layer configured to provide a distance between the second conductive layer and the sensor layer; wherein
at least one of the first dielectric layer is positioned beneath only a portion of the display at or near an edge of the display and is made of foam configured to compress due to the force applied to the display,
wherein the sensor layer is positioned between the first conductive layer and the second conductive layer beneath only a portion of the display at or near an edge of the display.

16. A system according to claim 15, comprising at least one processor and a memory storing instructions that, when executed, cause the system to transform the capacitance detected from the sensor layer to correspond to the force applied to the display.

17. A system according to claim 16, comprising a plurality of sensors at the sensor layer, wherein the at least one processor and the memory storing instructions cause, when executing the instructions, the system to detect the position of the force applied to the display.

18. A system according to claim 15, wherein the at least one processor and the memory storing instructions cause, when executing the instructions, the system to calibrate a sensor at the sensor layer by moving a predefined measurement range between a minimum capacitance value and a maximum capacitance value.

19. A system according to claim 15, wherein the display is configured to move and the foam is configured to compress when the force is applied to the display, wherein the force is equivalent to the force caused by a human finger.

20. A system according to claim 15, wherein the display is an Organic Light-Emitting Diode display.

* * * * *